United States Patent
Halberstadt (10) Patent No.: US 8,564,977 B2
(45) Date of Patent: Oct. 22, 2013

(54) STANDBY OPERATION OF A RESONANT POWER CONVERTER

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 750 days.

(21) Appl. No.: 12/666,895

(22) PCT Filed: Jul. 2, 2008

(86) PCT No.: PCT/IB2008/052654
§ 371 (c)(1),
(2), (4) Date: Dec. 28, 2009

(87) PCT Pub. No.: WO2009/004582
PCT Pub. Date: Jan. 8, 2009

(65) Prior Publication Data
US 2010/0208499 A1    Aug. 19, 2010

(30) Foreign Application Priority Data
Jul. 4, 2007    (EP) .................................... 07111758

(51) Int. Cl.
*H02M 3/335*    (2006.01)
(52) U.S. Cl.
USPC ..................................................... 363/21.02
(58) Field of Classification Search
USPC ......................................... 363/21.04–21.18
See application file for complete search history.

(56) References Cited

U.S. PATENT DOCUMENTS

| | | | |
|---|---|---|---|
| 4,631,652 A | | 12/1986 | Wendt |
| 4,766,528 A | * | 8/1988 | Marinus ..................... 363/21.02 |
| 5,359,278 A | * | 10/1994 | Notohara et al. ............. 323/222 |
| 6,963,178 B1 | * | 11/2005 | Lev et al. ...................... 315/307 |
| 2002/0145888 A1 | | 10/2002 | Yoshinaga et al. |
| 2008/0013346 A1 | * | 1/2008 | Westmoreland et al. ....... 363/37 |
| 2009/0207635 A1 | * | 8/2009 | Elferich ..................... 363/21.03 |

FOREIGN PATENT DOCUMENTS

| WO | 2005/112238 A2 | 11/2005 |
|---|---|---|
| WO | 2006/103606 A1 | 10/2006 |
| WO | 2006/103609 A2 | 10/2006 |

OTHER PUBLICATIONS

St Microelectronica; L6599—High-Voltage Resonant Controller—Target Spec; Jun. 2005; pp. 1-17.
NXP Semiconductors; ST L6599 Burstmode in WP6-218; Jan. 15, 2007.

* cited by examiner

*Primary Examiner* — Jue Zhang
*Assistant Examiner* — Henry Lee, III (57) ABSTRACT

A method of operating a resonant power supply in standby mode is disclosed, in which the switching period of the power supply is longer than the resonance period. The power converter is operated in normal mode for a significant fraction of one resonance period. Efficient operation is maintained, despite the switching period being extended beyond the resonance period, by using resonance current to enable soft switching, where this is beneficial, and dumping the resonance current into the load where this is more beneficial. Control methodologies to regulate the output power are also disclosed.

13 Claims, 12 Drawing Sheets

STANDBY OPERATION OF A RESONANT POWER CONVERTER

FIELD OF THE INVENTION

The present invention relates to a power supplies and in particular the invention relates to a standby mode of operation of a resonant type DC-DC power converter.

The present invention is particularly relevant to devices that require a normal level of power as well as a lower level of power for use in a stand-by mode. Examples of such devices are consumer electronic devices such as computers, television and the like.

BACKGROUND OF THE INVENTION

Power converters for consumer applications operate at partial load under standby conditions for a relatively large part of their lifetime. Whilst functioning in this operation mode, it is desirable to draw power from the mains supply at as low a level as is conveniently possible. Therefore it is desirable to use a power converter design for the power supply which operates with a high efficiency not only under full load conditions, but also for partial load, especially at low standby mode.

Power supplies operating under nominal "no load" conditions of operation need at least to convert a small power level to supply their own circuitry, such as IC, resistive deciders and opto-couplers. "No load" input power smaller than for example 300 mW and input power smaller then 1 W at 500 mWatts output power is becoming increasingly common as a standard requirement.

For powers larger than approximately 100 Watts at full load, resonant LLC topology is of interest and commonly adopted due to its high efficiency and small volumes/high power density. However, one of the main disadvantages for resonant LLC technology is its relatively low efficiency under low load operation (when operated in the most common operation mode, that is, using a fifty percent duty cycle). Losses in this mode of operation may be a multiple of the required stand-by power.

A second mode of operating a resonant power supply under low load conditions is to use "burst mode" operation. In this case the resonant power supply is completely switched off periodically. Whilst switched on, hard switching cannot be avoided. Furthermore large output filters are required to make effective use of burst mode operation.

An alternative solution has been proposed in Patent Application Publication WO 2005/112238A2, to Koninklijke Philips Electronics N.V. This publication discloses a method wherein the timing of the two control switches is such that high side switch (HSS) conducts during a short interval during which both the primary current increases to a certain level and magnetising energy is built up in the transformer. It is during this interval that most of the output current is delivered. At the end of this interval the HSS is turned off, and the low side switch (LSS) is turned on shortly after this moment (the duration of the gap being such as to facilitate soft switch-on of the LSS, as is well known by those skilled in the art). The output current rapidly decreases to 0. The magnetising current starts to resonate in a resonant circuit which is defined by the resonant capacitor, leakage inductance and the magnetising inductance in series. At a moment corresponding to the Nth negative maximum of the magnetising current, the LLS is turned off. N can typically have a value from 0 to several hundred. At that moment the half bridge load is charged by the magnetising current and provides a soft switch-on for the HSS, ready for the next HSS conduction interval.

Advantageously, this method makes it possible to significantly decrease the core losses due to the magnetising current since these losses are, for very low duty cycles, more or less proportional to the switch on time. Since the amplitude of the magnetising current is much smaller than that for the standard fifty percent duty cycle mode of operation, these losses are significantly reduced. The switching losses are further reduced as the magnetising current is beneficially used to charge the half-bridge node.

However, at very low power levels, the benefits achieved by this method are reduced as follows: firstly, at increasingly low power levels, increasingly more resonant cycles are skipped before the LSS is turned off to restart the switching cycle. This is because the energy per switching cycle is constant so, to reduce the power, the time per switching cycle must increase. As the resonating current resonates in the primary side resonant circuit however there will be some leakage resulting in a damping of the resonance. However, to maintain the ability for soft switching, a certain minimum level of magnetising current must still reside in the resonant circuit at the end of the switching period (i.e. the moment when the current is used to facilitate soft switching). So, to allow for the increased damping when the switching period is longer, the value of the magnetising current just after the HSS turn-off moment should be increased. This will lead to larger core losses, since these losses are proportional to the amplitude of the magnetising current raised to the power 2.3. It is clear, therefore, that as the power is further reduced, there will come a time when the losses attributable to the damping outweigh the switching losses which are being avoided by soft switching. In practical solutions a compromise will be found between the switching losses and the magnetising current losses. So in practice, the efficiency for an LLC converter can drop to around fifty to sixty percent or less at power levels below one percent of full load.

A second disadvantage of operating the power converter in this mode is that of its sensitivity to input voltage variations, since during the HSS conduction period the ratio between the current directly transferred to load and current built up in the magnetising inductors decreases as the voltage decreases. This could lead to a situation where no power at all is converted to the load should the input voltage fall to below approximately seventy five percent of its nominal value. Additional circuitry is required to overcome this, with the consequence of further efficiency decreases and increased costs associated with the additional circuitry.

Therefore, there is a continued need for improved methods of operation of LLC resonant power converters.

SUMMARY OF THE INVENTION

According to a first aspect of the invention there is provided a method of operating a resonant power converter under low-load conditions, the power converter comprising a primary-side circuit, a transformer and a secondary-side circuit, the primary side circuit comprising a first switch, a second switch and a capacitance (Cr) and having a resonance period determined by the capacitance (Cr) and the primary series inductance (Ls) of the transformer, including the sequential steps of closing the first switch at the start of a first sub-period which is longer than one-quarter of the resonance period; opening the first switch at the end of the first sub-period and the start of a second sub-period; closing the second switch after a first dead time; and opening the second switch at a moment which precedes the start of the first sub-period by a second dead time, the first sub-period and the second sub-period together defining a switching period of the power converter which is greater than the resonance period. Preferably the switching period is greater than a further resonance period, which further resonance period is determined by the capacitance of the capacitor (Cr), the primary series inductance (Ls) of the transformer and the magnetizing inductance (Lm) of the transformer.

Conveniently, the first switch is operated to act as a high side switch and the second switch as a low side switch, such as a conventionally used in resonant power converters; alternatively, however, the first switch is operated to act as a low side switch and the second switch as a high side switch.

Preferably, the first switch is opened to end the first sub-period after an output current pulse in the secondary side circuit has passed a peak value and still more preferably after the output current pulse achieves a first one half-sinusoidal cycle. This has the benefit of reduced magnetisation losses.

Advantageously, the first switch is opened to end the first sub-period at a moment such that the output current pulse corresponding to the first one half a sinusoidal cycle is equal to a second output current pulse immediately subsequent to the first output current pulse. Under some experimental conditions, this has been found to provide optimum performance According to a further aspect of the invention, there is provided a method of operating a resonant power converter under low-load conditions, the power converter having a primary-side circuit and a secondary-side circuit, the primary side circuit comprising a first switch and a second switch, including the sequential steps of closing the first switch at the start of a first sub-period, opening the first switch at the end of the first sub-period and the start of a second sub-period, closing the second switch after a first dead time, and opening the second switch at a moment which precedes the start of the first sub-period by a second dead time, the first sub-period and the second sub-period defining a switching period of the power converter which is greater than the resonance period, and further including the steps of opening the second switch to define the start of a dump interval during the second sub-period and during which an output current dump pulse results in the secondary-side circuit, and closing the second switch at the end of the dump interval. This allows beneficial use of the magnetisation current, and reduces losses arising from damping of the resonance current.

Preferably the second switch is closed to end the dump interval once the output current dump pulse has returned to substantially zero, and more preferably, the resonant circuit in the primary side circuit stores energy during a first part of the second sub period and the energy is transferred to the output current dump pulse during the dump interval. This allows the output circuit to use some of the magnetisation current.

Advantageously, the second switch is opened to start the dump interval at a time when the resonant circuit reaches its Nth negative maximum, when N is a non-negative integer, and more advantageously still, N is in the range of 1 to 20. At these times, most energy is stored in the inductance and thus available for dumping.

According to a yet further aspect of the invention, there is provided a method of operating a resonant power converter further including the step of regulating the output power, by controlling the duration of the first sub period, or preferably by controlling the moment at which the second switch is opened at the start of the second dead time in combination with the duration of the first sub-period. This has the advantage of effective and accurate control.

Preferably a parameter related to the voltage at the node between the first switch and the second switch less the voltage (Vcr) across the capacitor (Cr) is used to control the moment at which the second switch is opened at the start of the second dead time by opening the switch when the parameter is at a first threshold level, and control of the duration of the first sub-period is effected by opening the first switch when the parameter is at a second threshold level. Advantageously, this control method provides robust control and reduces spurious or unanticipated errors arising due to changes to external or other conditions such as supply voltage or output load voltage.

Preferably, the output power is further regulated by controlling the duration of the second sub period by: reducing the second sub period by an integral number of resonance periods if the output power is smaller then a first reference level and increasing the second sub period by an integral number of resonance periods if the output power is greater then a second reference level.

Advantageously the output power is regulated by the second above method if the output power exceeds the threshold and according to the first above method if the output power does not exceed the threshold.

These and other aspects of the invention will be apparent from and elucidated by reference to the embodiments described hereunder.

BRIEF DESCRIPTION OF DRAWINGS

Embodiments of the invention will be described, by way of example only, with reference to the drawings, in which.

DETAILED DESCRIPTION OF EMBODIMENTS

Figure 1:
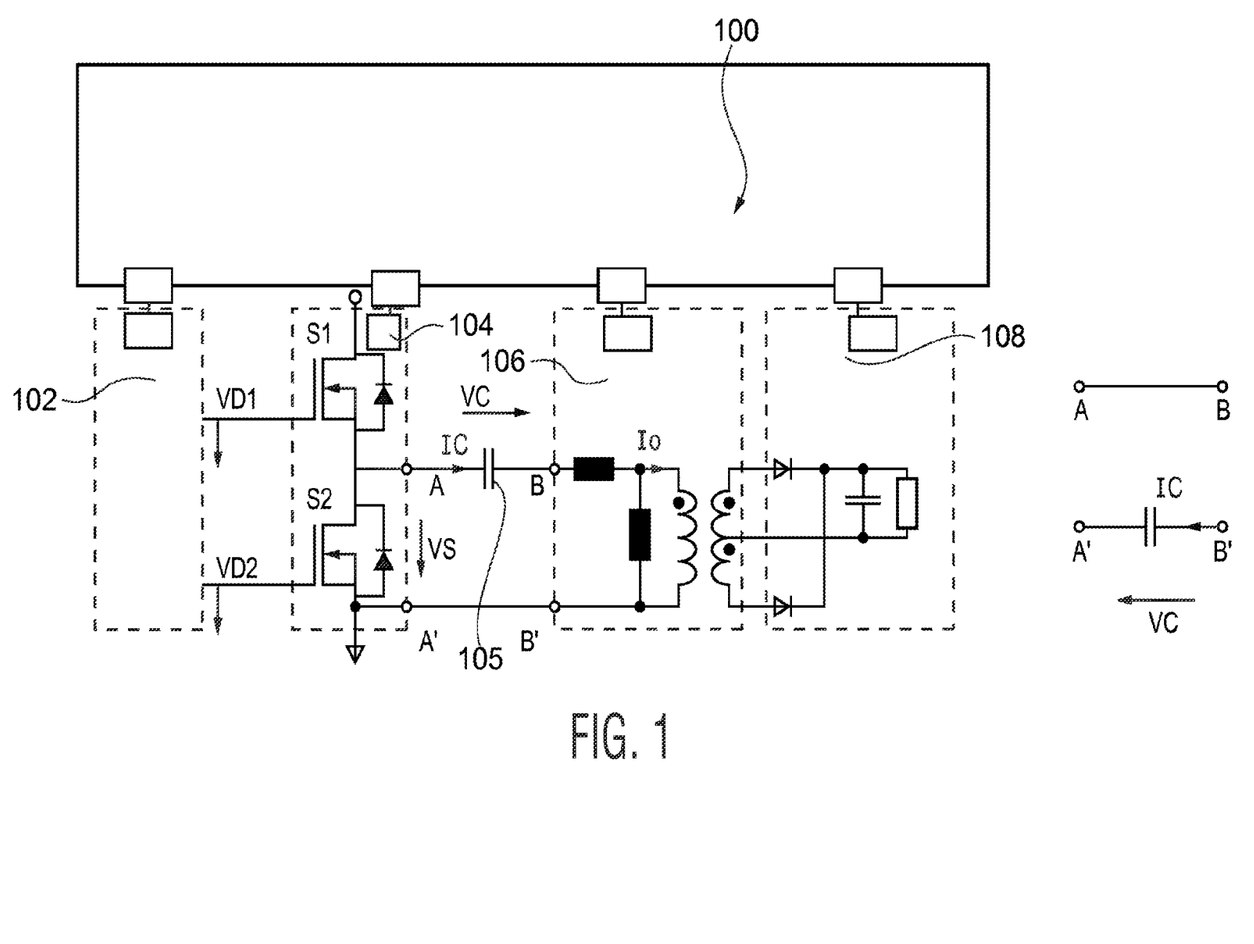
FIG. 1 shows a typical diagram of a resonant power converter with a non-grounded (left) and a grounded resonant capacitor (right)

FIG. 1 shows a resonant power supply 100 with a non-grounded (left) and a grounded (right) resonant capacitor. Resonant power supply 100 comprises a driver/controller 102, a half-bridge 104, a transformer 106 and an output/load 108. An inverter is formed by the half-bridge 104: The inverter includes two switches, S1 and S2. S1 is the high side switch (HSS) or control FET, and S2 is the low-side switch (LSS) or sync FET. A person skilled in the art will understand that the converter could equally well contain a full-bridge with two high side switches and two low side switches. The source of S1 is connected to the drain of S2, at a half-bridge node or switch node point A, which is connected to transformer 106 at B via a capacitor 105. Alternatively, the capacitor may connect the low side of the LSS (at A') to the transformer at B'.

In overview, during normal operation the switches S1 and S2 are alternately switched on. The voltage at the half-bridge node point A is thus alternately high (when S1 is on or conducting and S2 is not conducting or off), and low (when S2 is on and S1 is off). The capacitor smoothes the voltage to some extent. Thus the primary side of the transformer, at B, is presented with an alternating voltage (and alternating current), the magnitude of which depends on the mark-space ratio, or duty-cycle, of the switching. The voltage at the secondary side (which is dependant on the turns ratio of the transformer) is thus affected by the above duty cycle.

Figure 2:
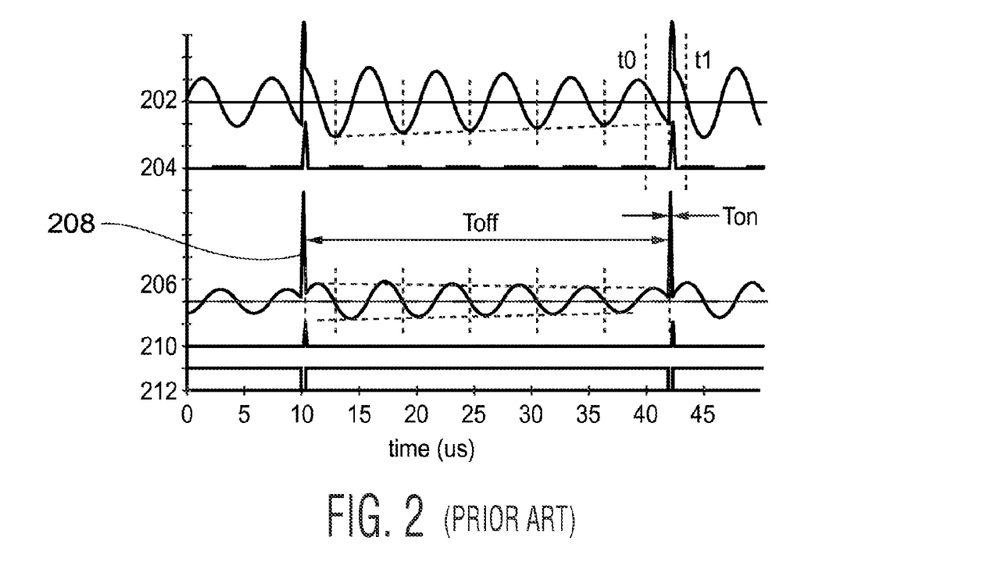
FIG. 2 shows wave forms of a resonant power converter operated in accordance with the prior art.

FIG. 2 shows the wave forms of a resonant power converter when used in standby mode according to the prior art. As disclosed in International Patent Application Publication WO 2005/112238A2, the contents of which are incorporated herein by reference, the power supply can be operated with a switching period which is longer than the resonance period of the resonant circuit. In FIG. 2 wave form 202 corresponds to the capacitor current at the input, that is IC in FIG. 1; wave form 204 corresponds to the reflected output power, I0 in FIG. 1; 206 is the capacitor voltage VC; 208 is the switch node voltage VS; 210 is the driver voltage VD1, and 212 is the driver voltage VD2. T_on represents a first sub-period during which the high side switch S1 (HSS) is closed or on; T_off represents a second sub-period during which the high side switch (HSS) S1 is off or open.

Figure 3:
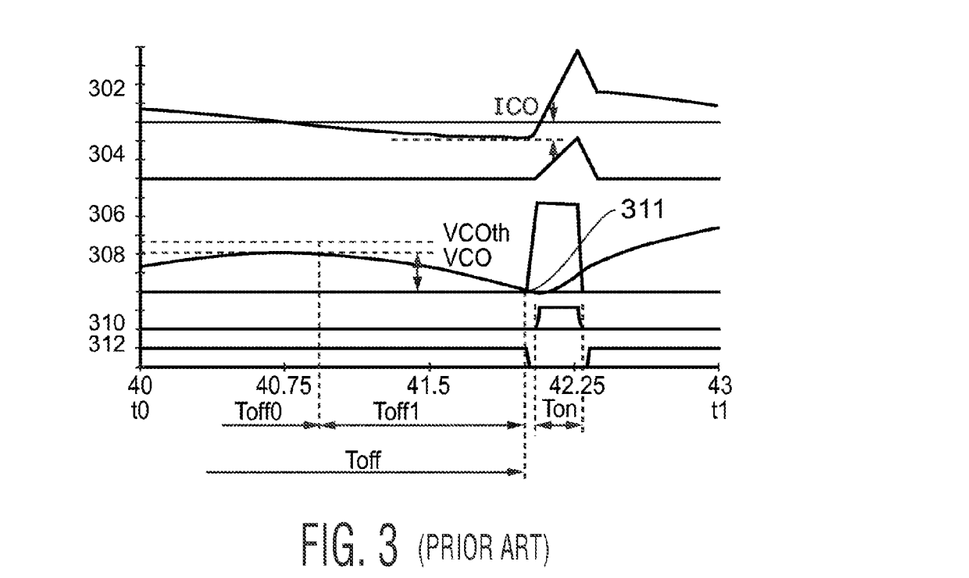
FIG. 3 shows detail of parts of the wave forms showing in FIG. 2.

FIG. 3 shows in greater detail part of the T_off period and T_on period at the end of one switching cycle and the commencement of the next. Corresponding waveforms are depicted, that is: wave form 302 corresponds to the capacitor current at the input; wave form 304 corresponds to the reflected output power; 306 is the capacitor voltage; 308 is the switch node voltage; 310 is the driver voltage VD1, and 312 is the driver voltage VD2.

Relevant aspects of the operation of a resonant power converter according to this prior art will now be described. During a first sub-period of the switching cycle, that is, T_on, the high side switch S1 is on or closed to conduct, and the low side switch S2 is open or off. During this period output current is transferred to the load and, at the same time, magnetising energy is built up in the transformer. Thus the capacitor current 302 rises, whilst VD1 (31) is high.

At the end of this period high side switch S1 is switched off, and low side switch S2 is turned on shortly after this moment (that is, VD1 310 goes low, then VD2 312 goes high). In this condition a resonance is established in the supply side of the circuit. The resonance is visible on the capacitor current 202, and capacitor voltage 206. In the example shown in FIG. 2 this resonance a period of has approximately 6 μs. The resonance includes some damping as shown by the decreasing amplitude of the oscillations in the capacitor current 202.

The switching period is concluded, when the switch node current 202 reaches its Nth negative maximum. At this moment, the switch node voltage 308 is zero-crossing, as shown at 311; The LSS S2 is switched off, and then the HSS S1 is switched on to restart the (next) switching period. As is well known in the field, the LSS S2 and HSS S1 are not simultaneously switched respectively off and on; a brief delay, or dead time, is introduced in a conventional manner between switching off LSS and switching on HSS. This is required due to the finite switch-times of the MOSFET devices, and ensures that a condition does not arise where both are conducting simultaneously (which would result in a electrical short-circuit of the supply power).

The reason that the switching period is concluded at this moment is as follows:

It is well known within the field of power converters that so called hard switching is associated with losses. In other words, there will be losses associated with the device, unless it can be arranged to operate in the so called soft switching mode. However, for soft switching or zero voltage switching (that is, Vds is small and ideally Vds=0) to occur, there should preferably be a current available, flowing through the switch's body diode, at the moment of switching. The current is required to discharge the parasitic capacitance (Coss, or output capacitance) across the body diode, prior to forward biasing of the diode. The resonance circuit provides such a current, however it is only available to the switch at specific parts of the resonant cycle. Thus, soft switching is enabled at the moment during the resonant cycle when the current is at a negative maximum and the voltage across the switch is zero at this moment. Thus the detailed moment when T_off finishes and the switching period concludes is determined to be close to the Nth negative maximum of the resonance current (where N is a non-negative integer, that is a positive integer including 0).

The general time when the T_off period finishes and the switching period concludes, however, is determined differently. Since the energy transferred to the load during the switching period is determined by the duration of the first sub-period when the HSS is closed, and the power of the load is defined by the energy per period divided by the switching period itself, the energy required by the load will determine the switching period. This sets the value of the integer N.

Figure 4:
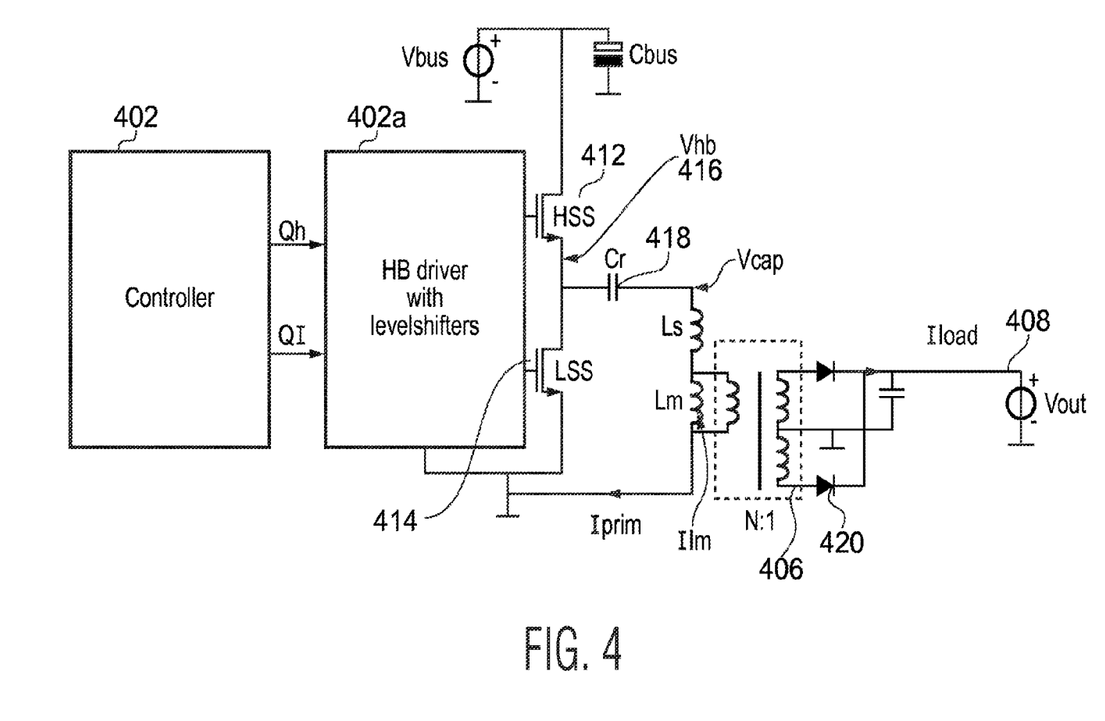
FIG. 4 shows an example power converter in accordance with the invention.

The present invention relates to modifications of, and improvements to, the above operating method of a resonant power converter. A resonant power converter suitable for operation in accordance with the present invention is depicted in FIG. 4. Similarly to FIG. 1 a driver/controller 402 (associated with half-bridge driver 402a) operates to drive an inverter comprising high side switch (HSS) 412, and low-side switch (LSS) 414. The voltage at the half-bridge load 416 is depicted by Vhb, and is connected to the transformer by resonance capacitor 418 (Cr). Associated with the primary side of the transformer 406 is a magnetising, or mutual, inductance (Lm) and a switching, or primary side, inductance (Ls). The secondary side of the transformer 406 is connected via half-bridge pair of diodes 420 to the load. The half-bridge power converter described above is entirely conventional, and will be familiar to a person skilled in the art. The invention is equally applicable to the operation of other, similar, power converters such as will be familiar to those skilled in the art, and an example of which is fly-back converters.

Two resonance periods can be associated with the circuit arrangement of FIG. 4. A first resonance period (hereinafter referred to as the "quiescent resonance period"), is associated with periods where the secondary diodes 420 are not conducting. This quiescent resonance period is the inverse of the resonance frequency of the resonance circuit defined by Cr and (Lm+Ls); in the example shown in FIG. 5 with a scale of 5 μs/division, the quiescent resonance period is around 16 μs). Conversely, during the period while HSS is conducting, one secondary diode is also conducting, and the magnetising inductance Lm is then shorted by the conducting secondary diode. Thus the resonance period associated with this state (hereinafter the "conversion resonance period"), is defined by the resonant circuit consisting of Cr and Ls only. Since the quiescent resonant circuit has a larger inductance (Ls+Lm) than the conversion resonant circuit (Ls only), the corresponding quiescent resonance period is larger than the conversion resonance period.

Figure 5:
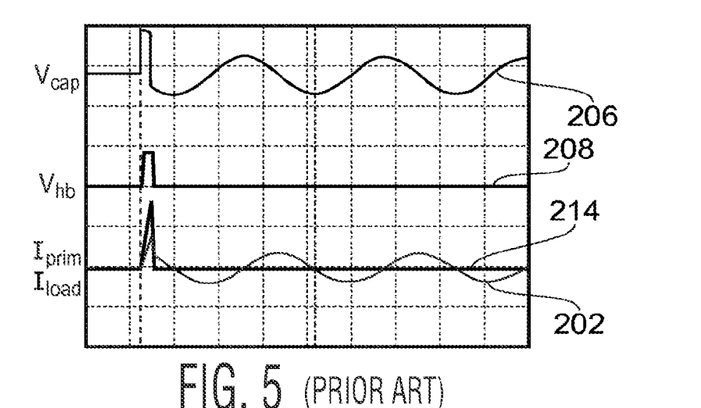
FIG. 5 shows wave forms of a resonant power converter in accordance with the prior art.

FIG. 5 depicts part of the switching cycle shown in FIG. 2. The waveforms correspond to those shown in FIG. 2, and are reproduced in a form which is directly comparable to those of FIG. 6, which depicts the equivalent wave forms for a resonant power converter operated in accordance with a first aspect of the present invention. That is, in FIG. 6 the capacitive voltage Vcap is depicted by the top wave form 606, the half-bridge voltage Vhb by 608, the primary current I_prim by 602 and the output or load currents I_load by 614. FIG. 7 depicts the equivalent wave forms for a resonant power converter again operated in accordance with a first aspect of the invention, however in this example the HSS on period is slightly longer, as depicted by the longer pulse of wave form 708 compared with wave form 608. FIG. 7 also depicts dissimilar pulses in the load current I_load, respectively pulse1 714*a*, and pulse2 714*b*, which may be compared with the two more similar pulses in the output current depicted in wave form 614. FIG. 7 also depicts at points a, b, and c, the Nth minima in the primary current I_prim, where N=0, 1 and 2 respectively.

Figure 6:
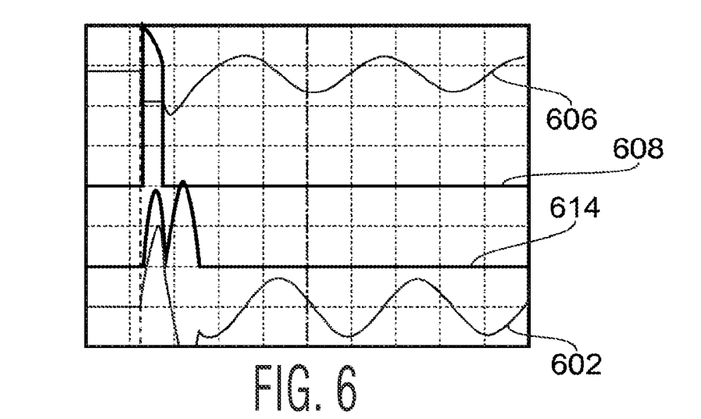
FIG. 6 shows wave forms according to a first aspect of the present invention.
Figure 7:
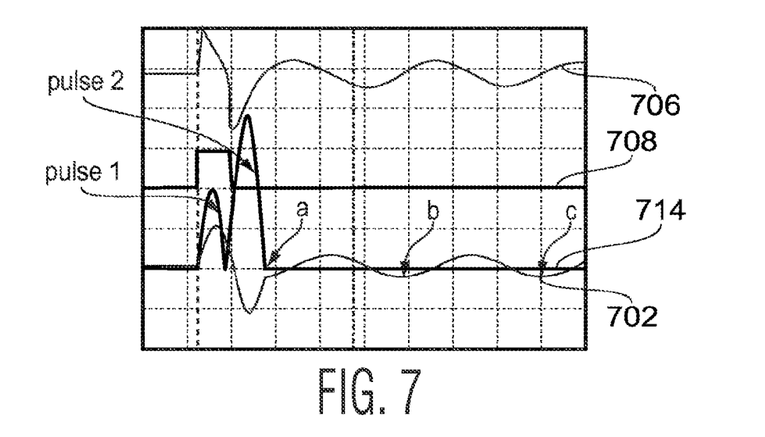
FIG. 7 shows wave forms according to a first aspect of the invention having a modified duration for the first sub-period during which HSS is on, relevant to those in FIG. 6.

Comparing FIG. 5 with FIGS. 6 and 7, it is a feature of the first aspect of the present invention that the voltage pulse at the half-bridge point (Vhb), which is equivalent to the duration of the HSS on period, is significantly longer than in the prior art. As shown in FIG. 5, the HSS-on period in the prior art is a small fraction of the quiescent resonance period (deriving from Cr, and Lm+Ls as discussed above); in the example shown in FIG. 5 with a scale of 5 μs/division, the quiescent resonance period is around 16 μs): in this example it is less then approximately one eighth of the quiescent resonance period. In the example shown in FIG. 6, however, the HSS on period is approximately one sixth of the quiescent resonance period, and in FIG. 7 a slightly longer HSS on period is shown, at slightly less than 25% of a quiescent resonance period. In the method according to this aspect, an optimum operating point outside the operating area disclosed in and intended by the prior art is used. In other words, the HSS is chosen significantly longer than that shown in FIG. 5. This is in order to allow the primary current 602 (I_prim) and the output current 614 (I_load) to follow an almost complete half sine wave shape, before the HSS is turned off. As a result, an increased energy transfer per cycle occurs compared with the prior art.

Viewed in terms of the conversion resonance period, the duration of the HSS on period is equal to or longer than one quarter of the conversion resonance period; this is in direct contrast to the prior art, in which the duration of the HSS period would be chosen to be less than one quarter of the conversion resonance period, since in the prior art it is a perceived requirement that the primary current or magnetising current is kept well below its maximum.

The inventors have appreciated that at this much larger energy per cycle, it is still possible to get a low magnetising current, which may be even lower than that of the prior art. This is because at increasing on time of the HSS, first the magnetising current increases, but with further increases of the HSS on time, the value of the magnetising current first reaches a maximum and then at even larger HSS on time, the amplitude of the magnetising current decreases and reaches a minimum value—but at a significantly increased energy per cycle (due to the longer HSS on time).

Thus the invention encompasses a HSS on time, which is generally between around one quarter of a conversion resonance cycle and one resonance cycle. Preferably, the resonance will be between approximately one quarter and one half a conversion resonance cycle. It should be noted that there is no firm upper bound or upper limit to the length of the HSS on time which is envisaged by the invention. In particular, since in some cases (especially with low supply voltage) the secondary diode goes out of conduction, the HSS conduction period will be longer than half a conversion resonance cycle, and will more nearly approach—or even exceed—half the quiescent resonance cycle. Thus the limits mentioned are indicative or approximate only.

Another important effect is that after the HSS is turned off, a second resonant cycle occurs, during which energy is converted to the load (pulse2 714*b* in FIG. 7). The ratio between the amplitude of the first and second output current pulse is intentionally controlled in order to get optimum efficiency; the control is effected by controlling both the HSS conduction period and the exact turn off moment of the low side switch, as discussed hereinafter. It has been shown that for this embodiment optimum efficiency is obtained when the amplitude of both output pulses pulse1 714*a* and pulse2 714*b* are approximately equivalent. Since some losses follow the root mean square (RMS) current, the equivalence of the two pulses may be conveniently determined either in terms of their energy (that is, the square of the current amplitude), or their current. It is apparent that the conditions of FIG. 6 are closer to optimum than those of FIG. 7.

Figure 8A:
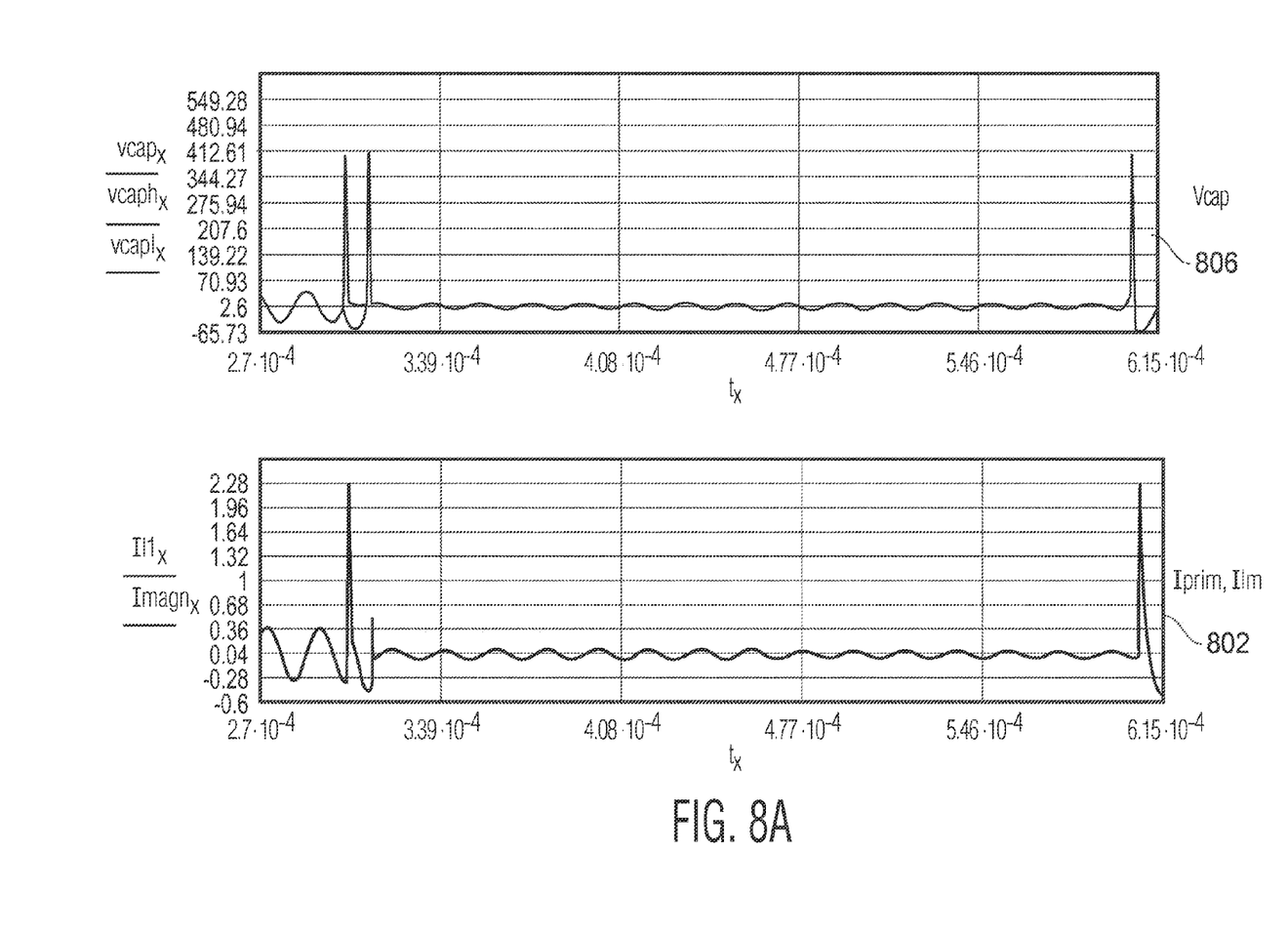
FIG. 8 shows various wave forms according to a second aspect of the invention.
Figure 8B:
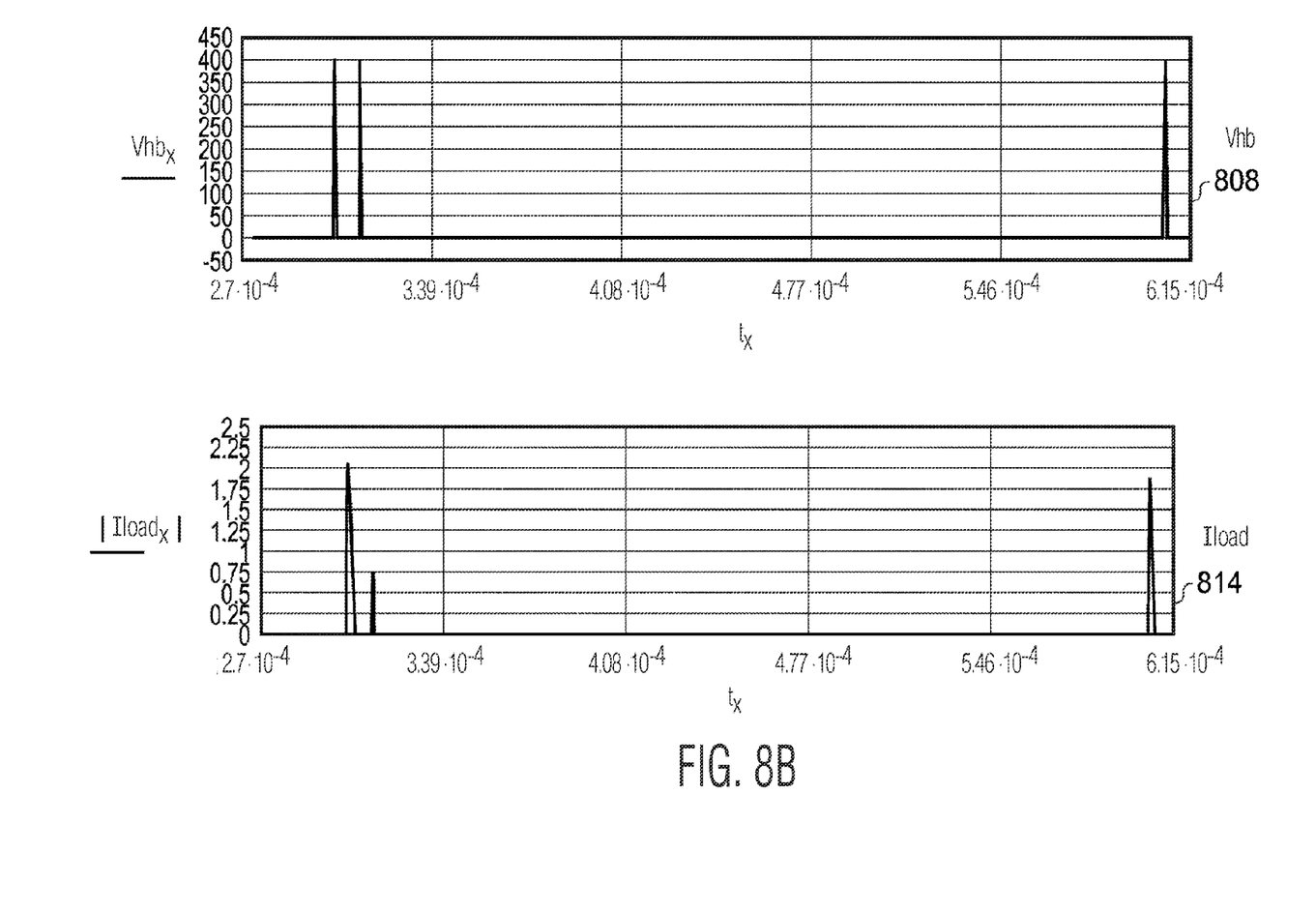
Figure 9A:
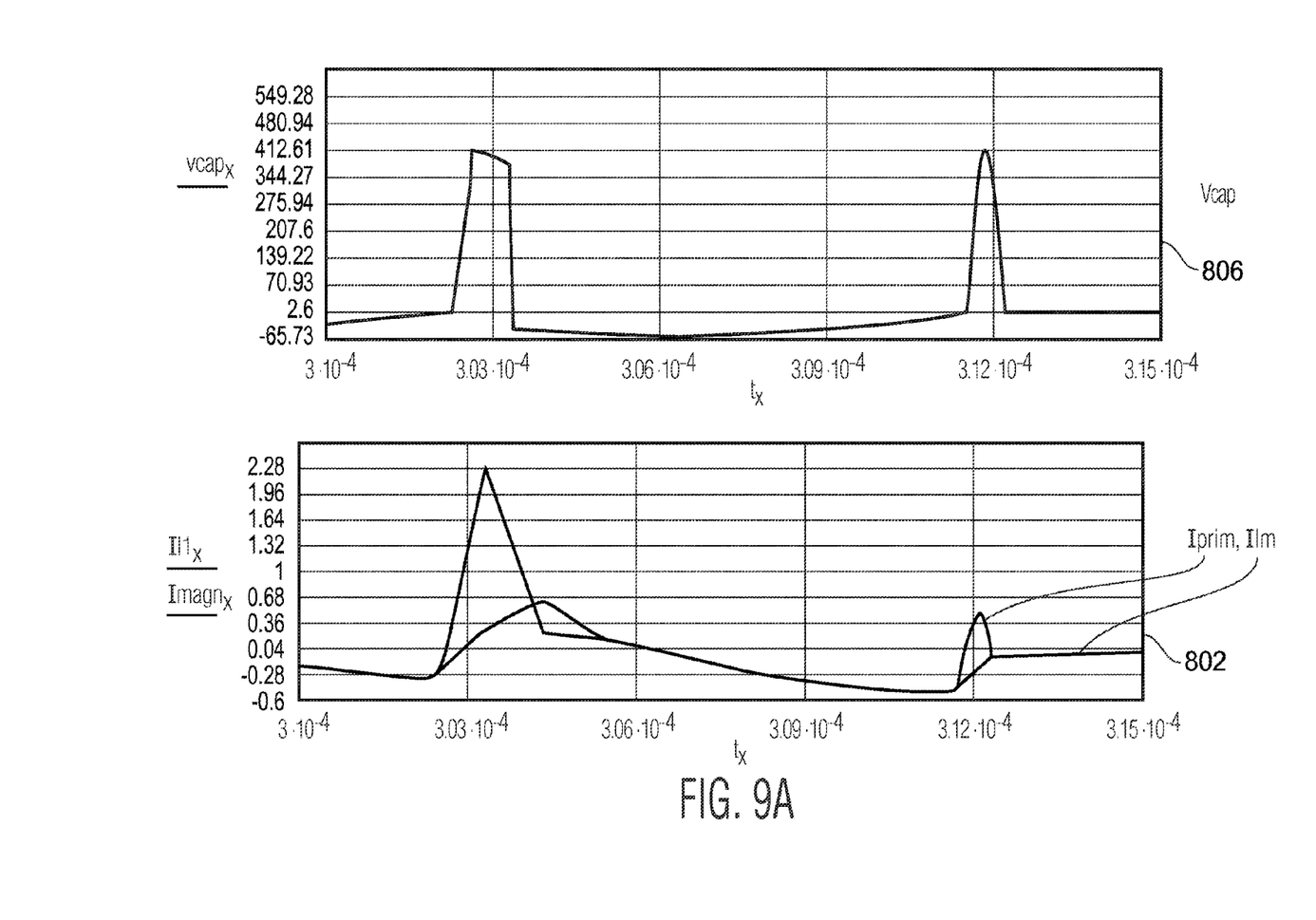
FIG. 9 shows detail of part of the wave forms of FIG. 8.
Figure 9B:
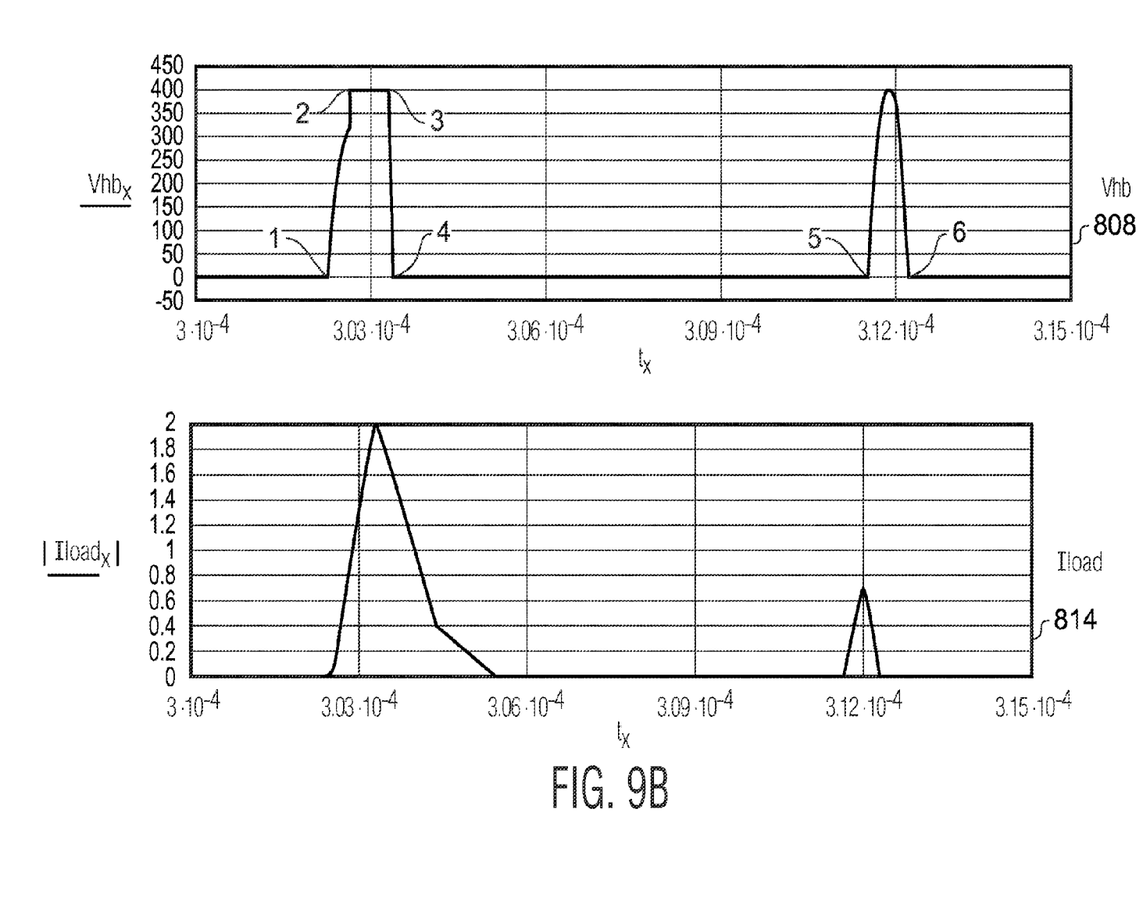

FIGS. 8 and 9 show the equivalent wave forms to those depicted in FIGS. 6 and 7, but for a resonant power converter operated in accordance with a method according to a second aspect of the invention. FIG. 8 depicts a complete switching cycle, whilst FIG. 9 depicts the first part of a single switching cycle. Waveforms are depicted showing Vcap (806), primary (and magnetising) currents I_prim (and I_Im) (802), Vhb (808) and I_load (814). This aspect of the invention is associated with the realisation by the inventors that it may be beneficial to utilise at least some of the energy stored in the primary side resonant circuit, by "dumping" the current into the load. This is carried out as follows: as described above, the high side switch HSS is turned on for a first sub-period, in order to transfer energy to the load and to charge the resonant circuit. After the HSS has been switched off, at the Nth negative maximum of the magnetising current the low side switch LSS is switched off, but the HSS is not switched on. In this condition, Vhb makes a ringing to the supply and back. The LSS is then turned back on. Most of the energy has been converted, or "dumped" to the load. There continues a resonance in the resonant circuit until the end of the switching period—although the amplitude of the resonance is smaller than it would have been had there been no current dumping. Note that in most cases, resonance current can be equated to both the magnetising current and the primary current at the LSS switch off moment, since the magnetising current is then equal to the primary current (as there is no output current). However, as can be seen for instance as FIG. 9, at times the magnetising and primary current split (by an amount related to the transformer efficiency and the output current). In some circumstances—such as the higher power situation of FIG. 10—this split can result in a negative maximum in the primary current (but not in the magnetising current) occurring during the second output current pulse. In such circumstances it is the magnetising current which is of interest and can trigger the LSS off.

This energy dump will now be described in more detail with reference to the half bridge voltage wave form (Vhb) 808 in FIG. 9. At moment 1, the LSS is switched off, preferably at a positive zero crossing of Vcap 806. At 2, the HSS is turned off, preferably at Vhb 808 reaching its maximum. At 3, the HSS is switched off, at the moment that corresponds with the amount of energy to be converted to the load during the switching period. At 4 the LSS is turned on, preferably at Vhb 808 reaching its minimum. At 5, the LSS is turned off at a moment corresponding to the Nth negative maximum in the primary current. Note that in this instance the primary current I_prim 802 is equivalent to the magnetising current I_Im since I_load 814 equals 0. Once the LSS is turned off the primary currents will charge Vhb 808 with part of a sine wave voltage, during which almost all of the magnetising energy is converted to the load, whereas Vhb 808 reaches almost the same value that it was at just before the LSS was switched off. Now the LSS is turned on again at 6, which is preferably just after Vhb reaches its minimum.

The timing of the start of the current dump (moment 5 above), is preferably at or close to the Nth negative maximum of the magnetizing current, since these are the times during which the resonant energy (which is equal to $0.5.L.I^2$) is stored in the inductance, rather than in the capacitance.

Figure 10:
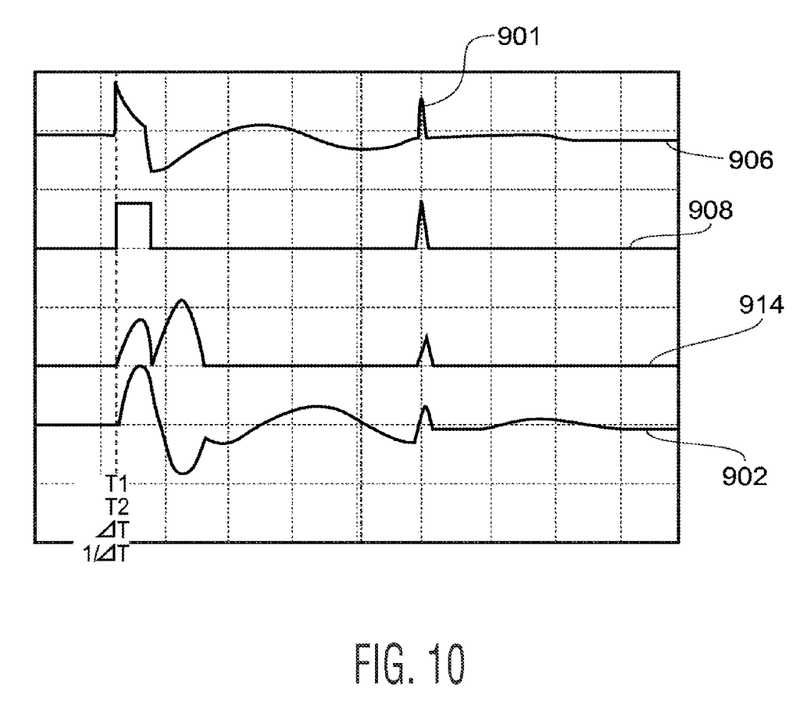
FIG. 10 shows wave forms according to both the first and second aspects of the invention.

FIG. 10 depicts the wave forms of an experimental laboratory measurement of the method according to this aspect of the invention, corresponding to the simulated wave forms in FIGS. 8 and 9. The current dump interval is clearly visible, in this example at a time 901 corresponding to the $1^{st}$ negative maximum of the primary current. Other examples will be readily apparent, where the dump interval commences at, for example, the 0th, 2nd 3rd or 4th negative maximum of the primary current.

As will be discussed below, in some embodiments, the energy dump method is applied for lower power requirements, and not applied for higher power requirements. However, a sudden change from no energy dump to energy dump would lead to a discrete step in output power and also increased problems in synchronizing the switching frequency (as the amplitude of the resonance strongly decreases); also this can give a change in output power or audio noise effects. Therefore, although the energy dump interval preferably starts on the 0th or 1st negative maximum, (the best option for converter efficiency being to use the $0^{th}$ negative maximum) it may be beneficial to start it as late as the 10th or even the 20th negative maximum.

A third aspect of the invention relates to regulating the output power of the power converter according to one or both methods of the first and second aspects of the invention.

A first method of regulating the output power of the power converter is by regulating the repetition time. In other words, the switching period (SP) of the power converter is controlled. In this method of regulation the energy per cycle is kept fixed. (That is to say, the duration of the HSS on period is held, in combination with the exact turn-off moment of LSS.) The switch off moment of the LSS, followed closely by the switching on of the HSS, is chosen near to the Mth negative maximum of the magnetising current, close to the desired repetition time or switching period. Regulation is carried out by varying the value of M.

Figure 11:
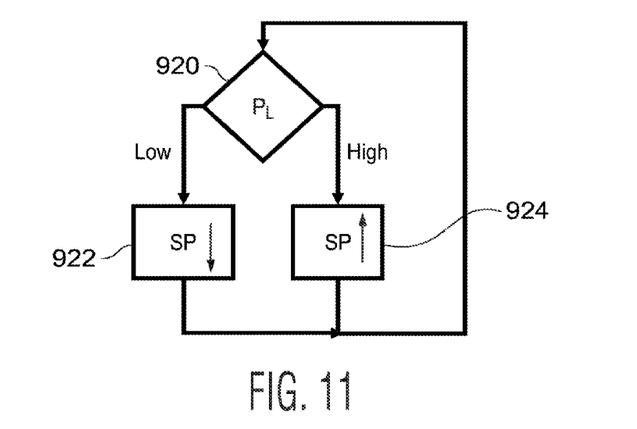
FIG. 11 shows a control methodology according to a third aspect of the invention.

Power regulation according to this method is schematically depicted in FIG. 11. The output power $P_L$ is monitored at 920: if the output power $P_L$ is higher than that required by the load then the switching period SP is increased 924 by changing the switch off moment of LSS from the Mth negative maximum of the magnetising current to the (M+1)th negative maximum of the magnetising current. This increases the switching period and thus decreases the output power. Conversely, if the output power is lower than that required by the load the switching period SP is decreased 922 by changing the switch off moment of LSS from the Mth negative maximum of the magnetising current to the (M−1)th negative maximum of the magnetising current. This decreases the switching period and thus increases the output power.

Figure 13A:
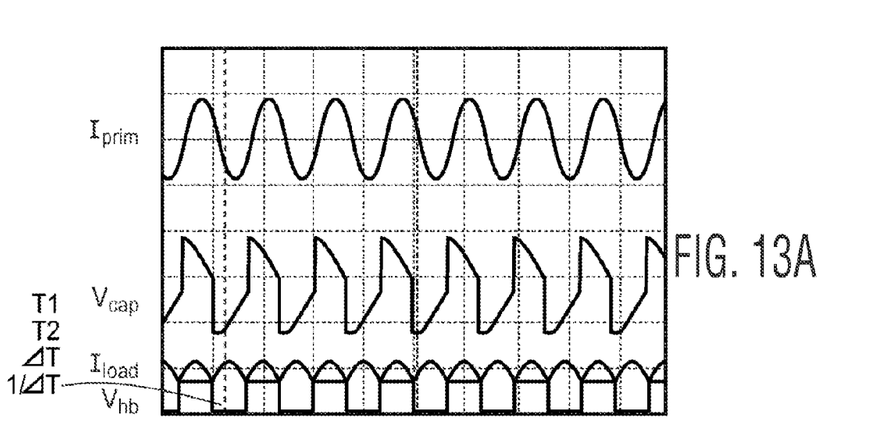
FIG. 13 shows wave forms according to one method of regulating the output power of a power converter according to an aspect of the invention.
Figure 13B:
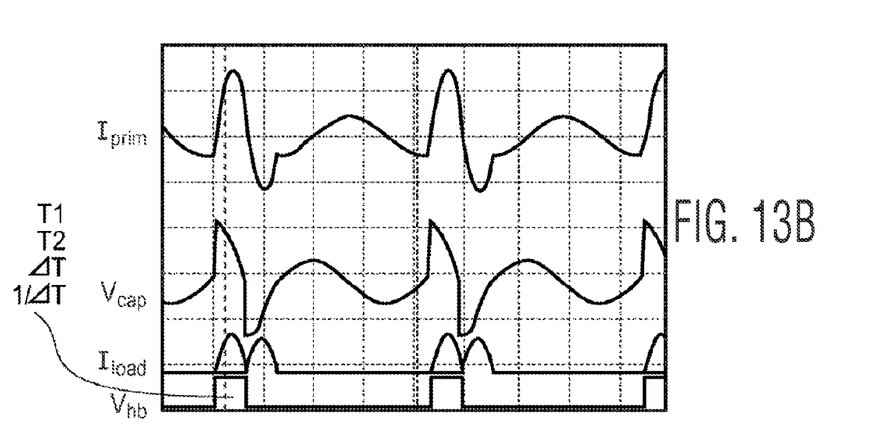
Figure 13C:
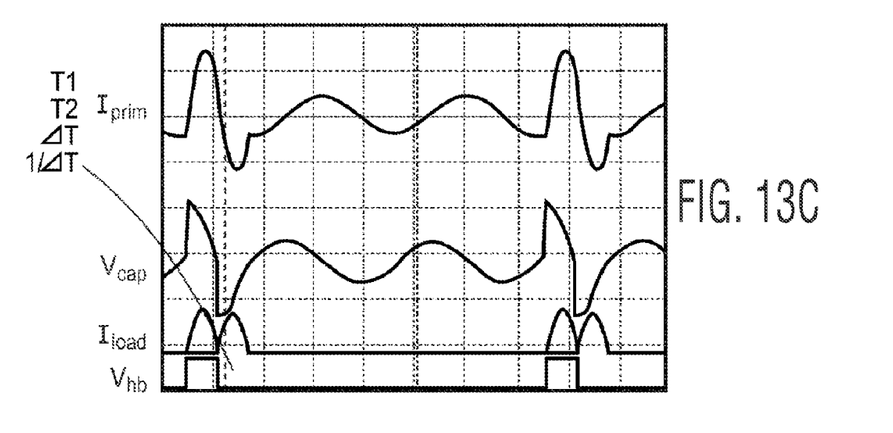

Laboratory measurements of various relevant waveforms obtained when operating a power converter according to this method are depicted in FIG. 13. FIG. 13 shows the Voltages Vhb and Vcap, together with the currents I_load and I_prim, for an example power converter regulated as above. FIGS. 13a, 13b, and 13c show the corresponding waveforms, when the LSS is switched off (to terminate the switching period), at the $0^{th}$, $1^{st}$ and $2^{nd}$ negative maxima of the magnetising current.

A second method of regulating the output power of the power converter is as follows: The repetition time, that is the switching period of the converter, is held fixed, but the duration of the HSS on period, which determines the energy per cycle delivered to the load, is regulated in combination with the exact LSS turn off moment; in addition, as discussed in relation to the first aspect of the invention, the switch off moment of the LSS, followed closely by the switching on of the HSS, close to the Mth negative maximum of the magnetising current, is controlled along with the duration of the HSS on period in order to optimise the ratio between the first and second output current pulses pulse1 and pulse2.

Figure 12:
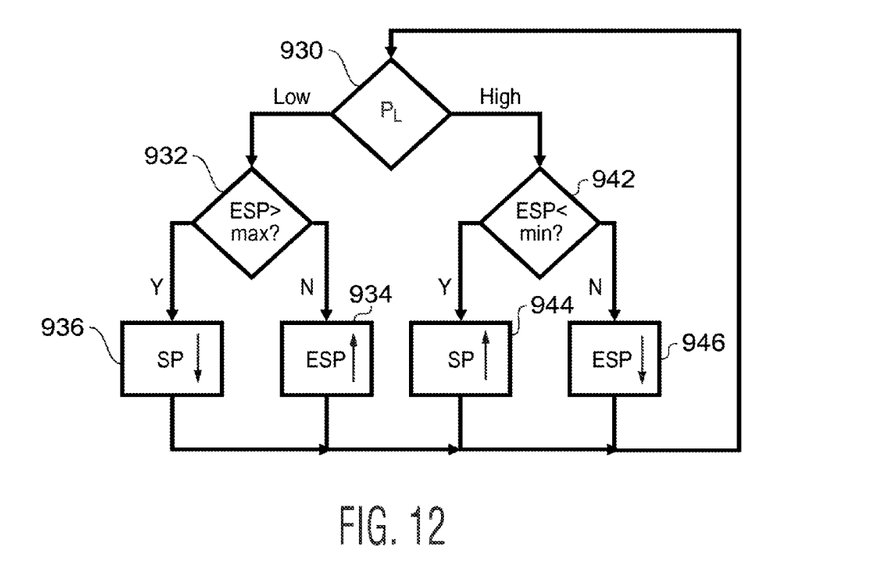
FIG. 12 shows a control methodology for use in very low power applications according to the third aspect of the invention.

FIG. 12 depicts schematically a control methodology which implements this method of regulating a power converter. The output power level $P_L$ 930 is monitored: if the output power level $P_L$ is lower than that required by the load then action is taken to increase $P_L$: the present Energy per Switching Period (ESP) is compared with a reference maximum level 932 and if the present ESP is less than the allowed maximum value then the ESP is increased 934; however if the present ESP is equal or greater than the maximum allowed value the switching period 936 is decreased by changing the LSS switch off moment from the Mth to the (M−1)th negative maximum of the magnetising current, as discussed above. Conversely, if the power level is higher than that required by the load then action is taken to reduce $P_L$: the present ESP is compared 942 with a reference minimum value and if higher than the allowed minimum value the ESP is decreased 946; however if ESP is equal to or less than the minimum permitted then the switching period is increased 944 by moving from the Mth to the (M+1)th negative maximum of the maximising current as described above.

From the above it is clear that this implementation of a control methodology comprises a two stage methodology: fine control is provided by adjusting the ESP; however, to avoid ESP going outside of acceptable limits (the minimum and maximum reference values), coarse control is provided by adjusting the switching period in discrete steps (by an integral multiple of the resonance period). Although this methodology has been described in terms of increasing (or decreasing) the switching period by a single resonance period, it will be apparent to a person skilled in the art, that the method is equally applicable to other integral multiples of the resonance period.

Control of the Energy per Switching Period (ESP), can be effected by directly varying the duration HSS on period. As discussed above, a longer HSS period generally corresponds to greater energy transfer to the load—that is, a higher ESP. However, the ESP is also dependant on several parameters such as the supply voltage and output voltage. The HSS on duration is therefore not a unique indicator of the energy per switching pulse.

Preferably, therefore, the HSS on period is indirectly controlled, and a more sophisticated means of controlling ESP is employed, as previously disclosed, for example, in International Patent Application Publication WO2006/103609A2 to Koninklijke Philips Electronics N.V., the contents of which are incorporated herein by reference. This control methodology relies on controlling the exact moment of switching off LSS, (close to an Mth negative maximum of the input current as required under the prior art), which is triggered when the voltage at the node point Vcap (see FIG. 4) is equal to one level V_capl. The HSS is switched on after a dead time according to conventional soft-switching timing techniques. The HSS is switched off when Vcap reaches a second predetermined level V_caph. The difference (V_caph−V_capl), is used as a representation of the ESP, since the latter is directly determined by (V_caph−V_capl) multiplied by the value of the resonant capacitor. From FIG. 4, and FIG. 1—left and right hand sides, it can be seen that Vcap can be calculated from Vhb, and the voltage Vcr across the capacitance Cr. In other words, Vcap=Vhb−Vcr.

Figure 14A:
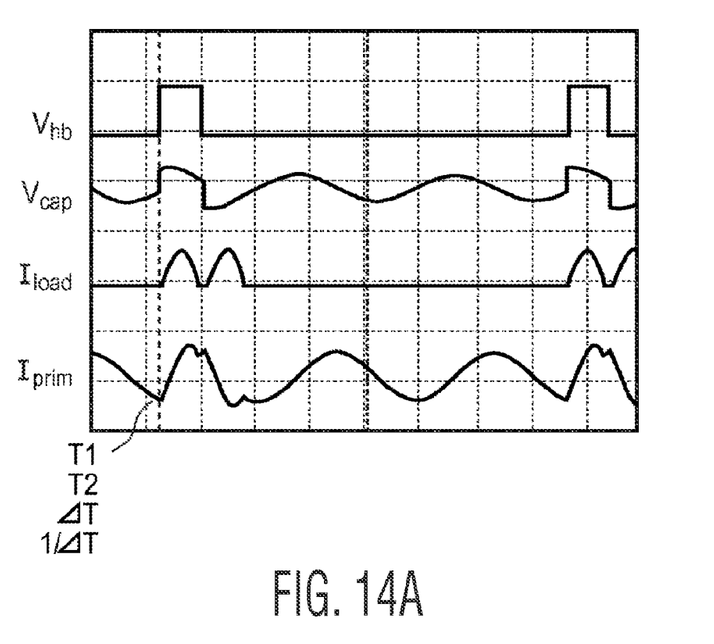
FIG. 14 shows wave forms according to another method of regulating the output power.
Figure 14B:
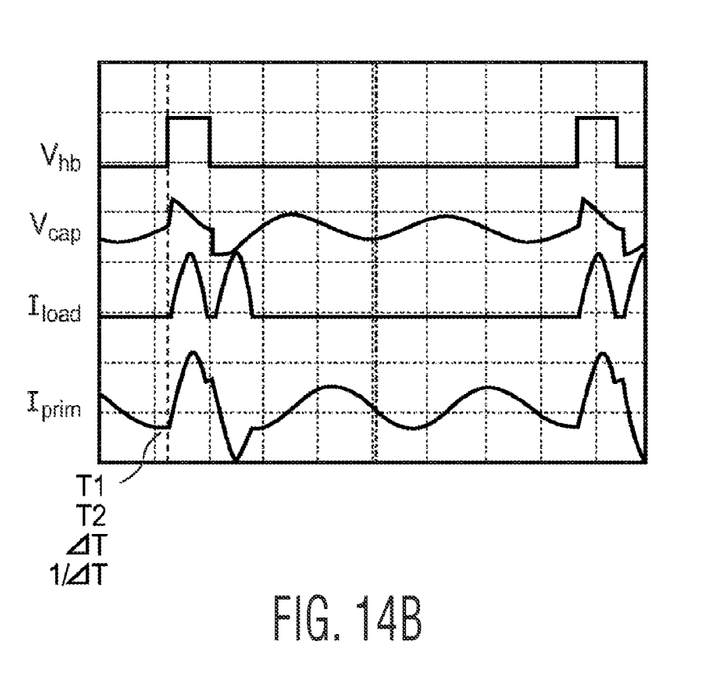

Laboratory measurements of various relevant waveforms obtained when operating a power converter according to this aspect are depicted in FIG. 14. FIG. 14 shows the Voltages Vhb and Vcap, together with the currents I_load and I_prim, for an example power converter regulated by ESP as above. FIGS. 14a and 14b show the waveforms corresponding to low power and high power output. (In this example, the LSS is switched off at the $3^{rd}$ negative maximum of the magnetising current in each case.)

According to a further embodiment of the present invention a combination of the two control methodologies discussed above is implemented: at higher power the ESP is regulated as discussed above such that the energy per pulse is kept between an allowable minimum and an allowable maximum. When the energy per cycle needed to deliver a certain power at the present switching period becomes too small, the switching period is reduced by a discrete step: this results in a higher power at the same energy per pulse. Conversely, when the energy per cycle becomes too high, the switching period is increased by a discrete step. At lower power, however, the energy per cycle is kept fixed and regulation is carried out solely by discrete steps in the switching period. This combination of two control methodologies avoids large discrete steps, relative to the power level, with their associated disadvantages such as ripple, audio noise etc.

In an alternative embodiment of the present invention the energy dump method described above is used only when the required output power is below a reference power level: this is due to the fact that use of the energy dump method tends to preclude soft switching (since the current required for soft-switching is no longer available). At higher output loads the hard switching losses associated with using the energy dump method become equal to or exceed the magnetising losses associated with not using the energy dump method. In one preferred example, the reference power level to determine whether or not to utilise the energy dump method corresponds to between approximately 5 and approximately 20 resonant cycles.

The embodiments described above are based on the high side switch (HSS) conducting during a short interval during which both the primary current increases to a certain level and magnetising energy is built up in the transformer, and the low side switch conducting for a longer period, during which there is a resonance in the primary side circuit. Complementary configurations will be apparent, in which it is the LSS which conducts during the short priming interval, and the HSS which conducts during the resonance period. In other words, the roles of the HSS and the LSS may be reversed. In these cases, the power converter operates in essentially the same way with the same signals, but with opposite polarity—and a shift in DC voltage over the resonant capacitor. Since the output current is rectified, there is no significant change to the output current. Inevitable ancillary changes to the external circuitry, such as a floating supply to the HSS driver, are required for a practical device operated in this method, but the operation of the device is essentially unaffected.

From reading the present disclosure, other variations and modifications will be apparent to the skilled person. Such variations and modifications may involve equivalent and other features which are already known in the art of resonant power converters and which may be used instead of, or in addition to, features already described herein.

In the above description and the claims, certain actions or events are described as occurring simultaneously, at a particular time, or at a specific moment in time. It should be noted that such terminology is used purposively, and that the event or action is not constrained to the exact moment specified, but encompasses approximate identity, or closeness, of time. In particular, and by way of example the start and end of the first and second sub-periods corresponding to the HSS-on period and the HSS-off periods may be adjusted and modified according to known techniques, such as to provide a brief interlude or overlap between the HSS-on period and the LSS-on period in order to make use of the beneficial effects of soft-switching, as will be readily apparent to the person skilled in the art and for example as discussed in the prior art, an example of which is the detailed switching timing discussed in Patent Application Publication WO 2005/112238A2 to Philips.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method of operating a resonant power converter under low-load conditions, the resonant power converter comprising a primary-side circuit, a transformer having a primary series inductance and a magnetizing inductance, and a secondary-side circuit, the primary-side circuit comprising a first switch, a second switch, and a capacitor having a capacitance, and having a resonance period determined by both the capacitance and the primary series inductance of the transformer, wherein the method comprises:
- closing the first switch to start a first sub-period which is longer than one-quarter of the resonance period;
- opening the first switch to end the first sub-period and start a second sub-period;
- closing the second switch after dead time;
- opening the second switch at a moment which precedes the first sub-period by a second dead time, the first sub-period and the second sub-period together defining a switching period of the resonant power converter which is greater than the resonance period; and
- opening the first switch to end the first sub-period after a first output current pulse in the secondary-side circuit has passed a peak value; and
- opening the first switch to end the first sub-period after the first output current pulse achieves a first half of one cycle; and
- wherein the switching period is greater than a further resonance period determined by the capacitance of the capacitor, the primary series inductance of the transformer, and the magnetizing inductance of the transformer.

2. The method as recited in claim 1, wherein the first switch is operated as a low side switch and the second switch is operated as a high side switch.

3. The method as recited in claim 1, wherein the first switch is operated as a high side switch and the second switch is a operated as a low side switch.

4. The method as claimed in claim 1, further comprising:
- opening the first switch to end the first sub-period at a moment such that the first output current pulse corresponding to the first half is equal to a second output current pulse immediately subsequent to the first output current pulse.

5. A method of operating a resonant power converter under low-load conditions, the resonant power converter having a primary-side circuit and a secondary-side circuit, the primary-side circuit comprising a first switch and a second switch, the method comprising:
- closing the first switch to start a first sub-period that is longer than one-quarter of a resonance period;
- opening the first switch to end the first sub-period and start a second sub-period;
- closing the second switch after a first dead time; and,
- opening the second switch at a moment which precedes the first sub-period by a second dead time, the first sub-period and the second sub-period defining a switching period of the resonant power converter, which is greater than a resonance period
- opening the second switch to start a dump interval during the second sub-period; and
- closing the second switch at the end of the dump interval; and
- opening the first switch to end the first sub-period after a first output current pulse in the secondary-side circuit has passed a peak value.

6. The method as claimed in claim 5, further comprising:
- opening the first switch to end the first sub-period after the first output current pulse achieves a first half of one cycle.

7. The method as claimed in claim 6, further comprising:
- opening the first switch to end the first sub-period at a moment such that the first output current pulse corresponding to the first half is equal to a second output current pulse immediately subsequent to the first output current pulse.

8. A method of operating a resonant power converter under low-load conditions, the resonant power converter comprising a primary-side circuit, a transformer having a primary series inductance and a magnetizing inductance, and a secondary-side circuit, the primary-side circuit comprising a first switch, a second switch, and a capacitor having a capacitance, and having a resonance period determined by both the capacitance and the primary series inductance of the transformer, wherein the method comprises:
- closing the first switch to start a first sub-period which is longer than one-quarter of the resonance period;
- opening the first switch to end the first sub-period and start a second sub-period;
- closing the second switch after a first dead time; and
- opening the second switch at a moment which precedes the first sub-period by a second dead time, the first sub-period and the second sub-period together defining a switching period of the resonant power converter which is greater than the resonance period; and
- regulating output power by controlling a duration of the second sub-period by:
  - reducing the second sub-period by an integral number of resonance periods if the output power is smaller than a first reference level, and
  - increasing the second sub-period by the integral number of resonance periods if the output power is greater than a second reference level.

9. The method as claimed in claim 8, further comprising:
- regulating the output power by controlling the opening of the second switch to start the second dead time and the duration of the first sub-period; and
- if the first sub-period exceeds a first duration, reducing the second sub-period by an integral number of resonance periods, and
- if the first sub-period is shorter than a second duration which is shorter than the first duration, increasing the second sub-period by the integral number of resonance periods.

10. The method of operating a resonant power converter according to claim 8, further comprising:
- using a parameter related to a voltage at a node between the first switch and the second switch less the voltage across the capacitor to control the opening of the second switch when the parameter is at a first threshold level, and control of the duration of the first sub-period is effected by opening the first switch when the parameter is at a second threshold level.

11. A control circuit arranged to operate the resonant power converter by the method according to claim 8.

12. The control circuit according to claim 11, further comprising:
- an integrated circuit.

13. The resonant power converter comprising the control circuit according to claim 11.

* * * * *